US010931520B2

United States Patent
Wigren et al.

(10) Patent No.: US 10,931,520 B2
(45) Date of Patent: Feb. 23, 2021

(54) METHODS AND NODES FOR CONFIGURING A WIRELESS LINK

(71) Applicant: Telefonaktiebolaget LM Ericsson (publ), Stockholm (SE)

(72) Inventors: Torbjörn Wigren, Uppsala (SE); Johan Bergman, Stockholm (SE); Ari Kangas, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/761,942

(22) PCT Filed: Nov. 11, 2015

(86) PCT No.: PCT/SE2015/051195
§ 371 (c)(1),
(2) Date: Mar. 21, 2018

(87) PCT Pub. No.: WO2017/082783
PCT Pub. Date: May 18, 2017

(65) Prior Publication Data
US 2018/0262390 A1  Sep. 13, 2018

(51) Int. Cl.
*H04L 12/24* (2006.01)
*H04W 76/10* (2018.01)
(Continued)

(52) U.S. Cl.
CPC ........ *H04L 41/0803* (2013.01); *H04L 43/022* (2013.01); *H04W 4/70* (2018.02); *H04W 76/10* (2018.02); *H04W 88/02* (2013.01)

(58) Field of Classification Search
None
See application file for complete search history.

(56) References Cited

U.S. PATENT DOCUMENTS

| 2010/0057485 A1* | 3/2010 | Luft | H04W 4/70 |
| | | | 455/411 |
| 2012/0302254 A1* | 11/2012 | Charbit | H04W 64/00 |
| | | | 455/456.1 |

(Continued)

FOREIGN PATENT DOCUMENTS

| WO | 2011160232 A1 | 12/2011 |
| WO | 2014114920 A1 | 7/2014 |

OTHER PUBLICATIONS

Laya, Andres, et al., "Is the Random Access Channel of LTE and LTE-A Suitable for M2M Communications? A Survey of Alternatives", IEEE Communications Surveys & Tutorials, vol. 16, No. 1, First Quarter 2014, pp. 4-16.

(Continued)

*Primary Examiner* — Christopher M Crutchfield
*Assistant Examiner* — Alan L Lindenbaum
(74) *Attorney, Agent, or Firm* — Sage Patent Group (57) ABSTRACT

A network node (200) a wireless device (202) and methods therein, for configuring a wireless link (204) to be used for controlling a process at a wireless device (202) involving communication of control signals and feedback signals over the wireless link (204). The network node (200) sends a request message (2:2) to the wireless device (202) comprising a request for performance requirements of the wireless link (204) needed for the communication of control signals and feedback signals. The wireless device (202) determines (2:3) the performance requirements based on at least one of: 1) characteristics of the process, and 2) requirements for how the process is controlled. The wireless device (202) then sends (2:4) a response message comprising the performance requirements to the network node (200) which configures (2:5) the wireless link (204) so that the performance requirements of the wireless link are fulfilled. The process can thereby be properly controlled by the network node (Continued)

(200) by sending the control signals (2:7*a*) to the wireless device (202) and receiving the feedback signals (2:7*b*) from the wireless device (202) over the configured wireless link (204).

16 Claims, 6 Drawing Sheets

(51) Int. Cl.
*H04W 4/70* (2018.01)
*H04L 12/26* (2006.01)
*H04W 88/02* (2009.01)

(56) References Cited

U.S. PATENT DOCUMENTS

| | | |
|---|---|---|
| 2013/0003576 A1 | 1/2013 | Segura et al. |
| 2014/0247781 A1 | 9/2014 | Somasundaram et al. |
| 2016/0105531 A1* | 4/2016 | Godfrey ................ G05B 15/02 714/47.1 |

OTHER PUBLICATIONS

"3GPP TS 22.368 V1.1.1 (Nov. 2009)", 3rd Generation Partnership Project; Technical Specification Group Services and System Aspects; Service requirements for machine-type communications; Stage 1 (Release 10), Nov. 2009, pp. 1-23.

* cited by examiner

METHODS AND NODES FOR CONFIGURING A WIRELESS LINK

TECHNICAL FIELD

The present disclosure relates generally to a network node, a wireless device and methods therein, for configuring a wireless link to be used when controlling a process at the wireless device.

BACKGROUND

In the field of wireless communication, it is becoming increasingly common to employ so-called Machine-to-Machine, M2M, devices, also known as Machine Type Communication, MTC, devices, to implement automatically operated processes. Such MTC devices may be configured to operate automatically by sending data and receiving control signals according to some predefined process. An MTC device may for example be configured to measure and report some metric or parameter of interest, such as temperature, pressure, voltage, battery level, light, motion, sound, distance to objects, etc., and to operate in the process in response to some control signals received from a controlling node or the like, to mention a few illustrative examples. The term "MTC device" will be used in this description to denote any wireless device that is used for automatically operating a process at the device which includes receiving control signals and transmitting feedback with data and/or reports over a wireless interface.

An MTC device may be wirelessly connected to a serving network node of a radio network, typically a base station, over a wireless link to report measurements and observations to the controlling node which may be implemented in the serving network node or in some other entity connected thereto. The controlling node may further send various commands and instructions back to the MTC device to control its operation. In this description, any data sent from the MTC device to the controlling node will be referred to as "feedback signals" and any commands and instructions sent from the controlling node to the MTC device will be referred to as "control signals". Further, the term "radio network" could be replaced by wireless communications network throughout this disclosure.

Figure 1:
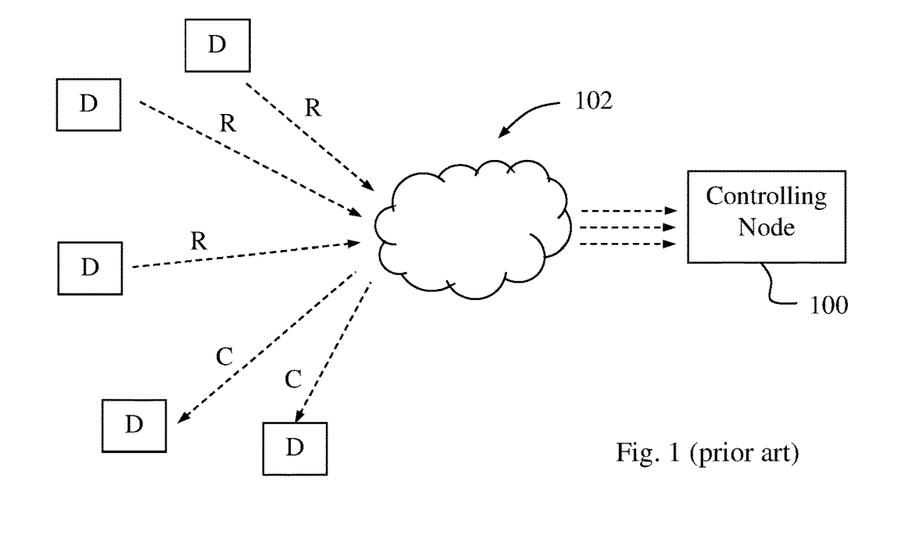
FIG. 1 is a communication scenario illustrating usage of MTC devices, according to the prior art.

An example of an arrangement with multiple MTC devices is schematically illustrated in FIG. 1 where the MTC devices "D" are operatively installed at different locations, the devices D being configured to send reports "R" to a controlling node 100 over a radio network 102. The controlling node 100 may also send various control signals "C" to different MTC devices D to control their operation. Different devices D may be connected to different serving network nodes, not shown, and more than one device may be connected to the same serving network node.

For some processes, it is of interest to ensure a certain reliability when control signals and feedback signals are communicated with the MTC devices, e.g. to avoid that too much errors occur in the information communicated when high accuracy is required. It may also be of interest to ensure low latency in this communication, e.g. when delays are unacceptable. It may further be of interest to provide a certain bitrate in the communication, e.g. depending on resolution, what protocols are used, and the amount of information to be transferred. MTC-enabled processes with harsh requirements for high reliability, low latency and/or high bitrate are sometimes referred to as "critical MTC". The above may thus put considerable demands on the performance of the wireless link used in this communication. It is furthermore of interest for network operators to improve capacity in their networks by utilizing the available radio resources as efficiently as possible. It should be noted that it is often preferable to control a process over a wireless link instead of using a cable link, e.g. due to lower costs or practical problems with installing a cable.

If a data receiving node detects that data has not been received correctly from a data sending node, the data receiving node may according to conventional procedures return an error indication to the data sending node which then may retransmit the same data to the data receiving node, e.g. until the data has been received correctly. However, such feedback signaling for enabling retransmissions adds delay to the communication which may not be acceptable, e.g. when the data rapidly becomes out of date and therefore useless at the data receiving node. The feedback signaling also consumes additional radio resources and may further generate additional interference in the network.

It will thus be of great interest to provide a suitable wireless link that can be used when controlling some process at the MTC device which process may involve one or more advanced applications of automatic control. The requirements of the wireless link are expected to vary greatly for different control applications. For example, a process involving control of a robot for component mounting on printed circuit boards may require high bandwidths for conveying information safely within a very short time span while delays of more than a fraction of a millisecond may be unacceptable, when the process is controlled remotely over the wireless interface. On the other hand, in a process involving control of a crane for container logistics in ports, a considerably lower bandwidth may be sufficient and much longer delays can be tolerated. So-called Networked Control Systems, NCS, have been defined where the controller function and the controlled process are located at opposite sides of a wireless interface connecting a controller node and a controlled process node, typically an MTC device.

It is however a problem that the above-mentioned requirements for low latency, high bandwidth and reliability, e.g. in critical MTC, may not be met when a wireless link is used for controlling a process at a wireless device. In that case, any data or signals transmitted to or from the wireless device over the wireless link may be more or less useless or even harmful for the wireless device, e.g. by being corrupted or insufficient or arriving too late, which naturally may affect the process negatively. Furthermore, precious radio resources have thereby been wasted to no avail, and interference may also have been generated by such pointless transmission which could potentially be harmful to other transmissions in the radio network and the overall capacity in the network. On the other hand, spending more radio resources than needed in the above communication will likewise result in the above drawbacks of wasted radio resources and potential interference.

SUMMARY

It is an object of embodiments described herein to address at least some of the problems and issues outlined above. It is possible to achieve this object and others by using a network node, a wireless device and methods therein, as defined in the attached independent claims.

According to one aspect, a method is performed by a network node of a radio network, for configuring a wireless link to be used for controlling a process at a wireless device, said process involving communication of control signals and feedback signals over the wireless link. In this method, the network node sends a request message to the wireless device, the request message comprising a request for performance requirements of the wireless link needed for the communication of control signals and feedback signals. The network node then receives a response message from the wireless device, the response message comprising the performance requirements of the wireless link, wherein the performance requirements of the wireless link are dependent on at least one of: 1) characteristics of the process, and 2) requirements for how the process is controlled.

Finally, the network node configures the wireless link so that the performance requirements of the wireless link are fulfilled. Thereby, it is possible to configure the wireless link by identifying and taking the relevant performance requirements into account, such that the process can be controlled and operated successfully over the wireless link. It is also possible to ensure that no more radio resources than necessary are spent on the communication over the wireless link which can enhance capacity and reduce interference in the network.

According to another aspect, a network node is arranged to configure a wireless link to be used for controlling a process at a wireless device, said process involving communication of control signals and feedback signals over the wireless link. The network node is configured to:
  send a request message to the wireless device, the request message comprising a request for performance requirements of the wireless link needed for the communication of control signals and feedback signals,
  receive a response message from the wireless device, the response message comprising the performance requirements of the wireless link, wherein the performance requirements of the wireless link are dependent on at least one of: 1) characteristics of the process, and 2) requirements for how the process is controlled, and
  configure the wireless link so that the performance requirements of the wireless link are fulfilled.

According to another aspect, a method is performed by a wireless device for assisting configuration of a wireless link to be used for controlling a process at the wireless device, said process involving communication of control signals and feedback signals over the wireless link. In this method the wireless device receives a request message from a network node of a radio network, the request message comprising a request for performance requirements of the wireless link needed for the communication of control signals and feedback signals. The wireless device then determines the performance requirements of the wireless link based on at least one of: 1) characteristics of the process, and 2) requirements for how the process is controlled. The wireless device further sends a response message to the network node, the response message comprising the determined performance requirements of the wireless link, thereby enabling the network node to configure the wireless link so that the performance requirements of the wireless link are fulfilled.

According to another aspect, a wireless device is arranged to assist configuration of a wireless link to be used for controlling a process at the wireless device, said process involving communication of control signals and feedback signals over the wireless link. The wireless device is configured to:
  receive a request message from a network node of a radio network, the request message comprising a request for performance requirements of the wireless link needed for the communication of control signals and feedback signals,
  determine the performance requirements of the wireless link based on at least one of: 1) characteristics of the process, and 2) requirements for how the process is controlled, and
  send a response message to the network node, where the response message comprises the determined performance requirements of the wireless link. Thereby, the network node will be enabled to configure the wireless link so that the performance requirements of the wireless link are fulfilled.

The above network node, wireless device and methods therein may be configured and implemented according to different optional embodiments to accomplish further features and benefits, to be described below.

A computer program is also provided comprising instructions which, when executed on at least one processor in either of the network node and the wireless device, cause the at least one processor to carry out either of the methods described above for the network node and the wireless device, respectively. A carrier is also provided which contains the above computer program, wherein the carrier is one of an electronic signal, optical signal, radio signal, or a computer readable storage medium.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to ensure that a wireless link between a network node and a wireless device is configured so that a process at the wireless device can be controlled properly from the network node side. This is done by configuring the wireless link so that performance requirements of the wireless link are fulfilled when control signals and feedback signals are communicated between the network node and the wireless device during the process. The performance requirements may have been defined by various link quality parameters such as acceptable delay and required bandwidth or data rate that the wireless link must satisfy, among other things, to be described in more detail below.

Throughout this description, the term "process" is used in a broad sense to basically represent any actions, measures or operations that can be controlled by radio communication over a wireless device which receives control signals from a process controller and sends feedback signals to the process controller which is implemented on the network node side. The control signals and the feedback signals are thus communicated over the wireless link discussed herein. For example, the process may be industrial or laboratorial although the solution is not limited thereto. Some illustrative examples of a process have been mentioned above. The control signals are typically produced dependent on the feedback signals, and vice versa.

Figure 2:
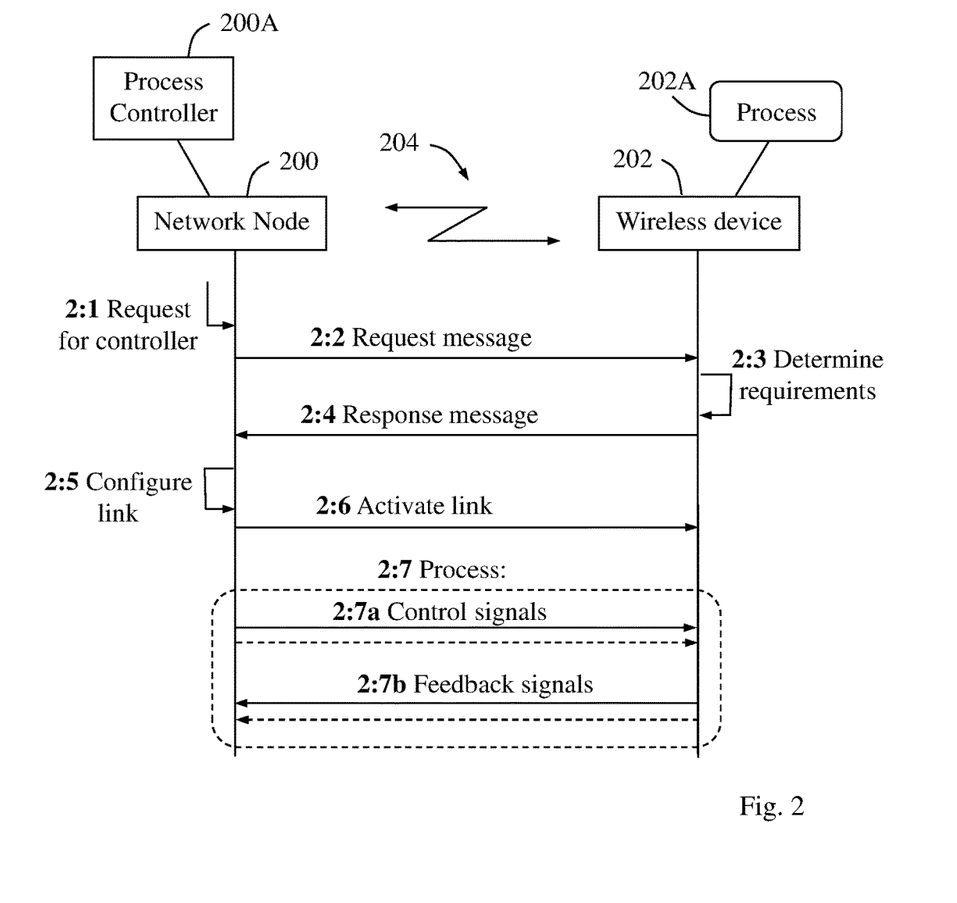
FIG. 2 is a signaling diagram illustrating an example of a communication where the solution is employed, according to some possible embodiments.

The solution will now be described in terms of a network node, a wireless device and methods therein, for realizing a wireless link to be used for controlling a process at a wireless device involving communication of control signals and feedback signals over the wireless link. First, the solution will be briefly outlined with reference to FIG. 2 which is an exemplary signaling diagram involving a network node 200 and a wireless device 202 which are connected to each other via a wireless link 204. FIG. 2 thus illustrates a procedure for configuring and using the wireless link 204 in a radio communication for controlling a schematically indicated process 202A which is executed at the wireless device 202. The process 202A is controlled from a likewise schematically indicated process controller 200A at the network node 200.

A first action 2:1 illustrates that the procedure of configuring the wireless link 204 may be triggered and initiated when the network node 200 receives a request for a process controller from some other node or entity, not shown, which is arranged for initiating process controllers in the radio network. The configuration of the process controller 200A is naturally depended on the process itself which is however outside the scope of this solution and not necessary to define here as such, although some examples will be briefly outlined later below. In a next action 2:2, the network node 200 sends a request message to the wireless device 202 comprising a request for performance requirements of the wireless link 204 needed for the communication of the control signals and the feedback signals back and forth.

The wireless device 202 then determines, in an action 2:3, the performance requirements based on at least one of: 1) characteristics of the process, and 2) requirements for how the process is controlled. The process may have been defined in terms of various process characteristics parameters and some examples of such process characteristics parameters will also be described later below. The required performance of a controller function for the process may have been defined in terms of various controller requirement parameters. Some examples of such controller requirement parameters will likewise be described later below.

If 1) is used, the performance requirements will basically reflect the properties of the process itself, as relevant for closed loop control. Some examples of process characteristics are how fast and potentially with what delay the process responds to a control signal, how linear the response is, how large disturbances will affect an entity, component or metric controlled by the process, and how accurately and with what delay the feedback signals can be measured. If 2) is used, the performance requirements will reflect what is needed to achieve satisfactory control of the process, such as how fast and how frequent the process must be regulated, and how good resolution and accuracy is needed in the control signals.

The wireless device 202 then sends, in an action 2:4, a response message comprising the performance requirements to the network node 200 which configures the wireless link 204 in another action 2:5, so that the performance requirements of the wireless link are fulfilled. Configuring the wireless link 204 may include selecting coding scheme and modulation form, setting up radio bearers and one or more carriers, selecting communication protocol, setting various radio parameters, and so forth. There are numerous ways of configuring a wireless link that may be used to fulfil some given performance requirements and the solution is not limited in this respect. The process can thereby be properly controlled by the network node 200 since the wireless link 204 is able to provide a performance required by the process and control thereof.

An action 2:6 illustrates that the wireless link 204 is activated by the network node 200 and a further action 2:7 illustrates that the process is executed and controlled by means of communication over the wireless link 204. In more detail, the network node 200 sends control signals to the wireless device 202 as indicated by an action 2:7a, and the wireless device 202 sends feedback signals to the network node 200 over the configured wireless link 204 as indicated by an action 2:7b. As mentioned above, the control signals are typically dependent on the feedback signals, and vice versa, which is commonly referred to as a closed feedback loop. Some schematic examples of how a process can be controlled by means of a closed feedback loop will be outlined later below with reference to FIGS. 8-10.

There are several potential advantages that may be achieved by using this solution. First, it is possible to configure a wireless link that fulfils any requirements associated with the control of a process, e.g. in critical MTC, by identifying and taking the relevant performance requirements into account. Thereby, the process can be controlled and operated successfully. Second, it is also possible to ensure that no more radio resources than necessary are spent on the communication over the wireless link which promotes the capacity in the network. Third, it is also possible to avoid that any extra interference is generated due to the use of unwarranted radio resources and radio parameters in the communication, likewise promoting the capacity and also the performance of other communications in the network.

Figure 3:
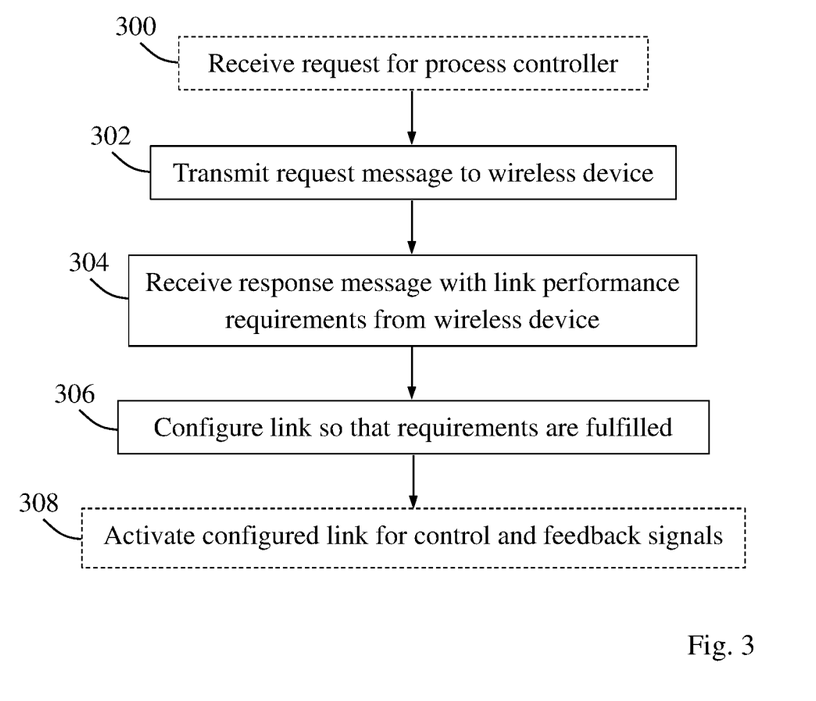
FIG. 3 is a flow chart illustrating a procedure in a network node, according to further possible embodiments.

An example of how the solution may be employed in terms of actions in a procedure performed by a network node of a radio network, for configuring a wireless link to be used for controlling a process at a wireless device, will now be described with reference to the flow chart in FIG. 3. It is assumed that the process involves communication of control signals and feedback signals between the network node and the wireless device over the wireless link. The procedure of FIG. 3 can thus be used to accomplish the functionality described above, and some possible but non-limiting embodiments will also be described. The procedure of FIG. 3 may be performed by the network node 200 when communicating with the wireless device 202, as illustrated in FIG. 3. In some possible embodiments, the network node may be a serving base station used for wireless communication with the wireless device, or a node that controls the serving base station.

An action 300 illustrates that the network node may receive a request for a process controller from a node or entity that initiates controller functionality for processes. Thus according to one possible embodiment, the wireless link may be configured by the network node in response to receiving a request for a process controller from a node or entity arranged for initiating process controllers in the radio network. In an action 302, the network node sends a request message to the wireless device, the request message comprising a request for performance requirements of the wireless link needed for the communication of control signals and feedback signals.

In response thereto, the network node receives a response message, in an action 304, from the wireless device after the wireless device has determined the requested performance requirements. Thus, the response message comprises the performance requirements of the wireless link, wherein the performance requirements of the wireless link are dependent on at least one of: 1) characteristics of the process, and 2) requirements for how the process is controlled. Another action 306 illustrates that the network node configures the wireless link so that the performance requirements of the wireless link are fulfilled.

According to another possible embodiment, a final action 308 illustrates that the network node may also activate the configured wireless link for the communication of feedback signals and control signals with the wireless device in said process, e.g. in the manner described above.

Various further possible but non-limiting embodiments will now be described. In some possible embodiments, the request message may further comprise a request for link quality parameters defining the performance requirements. The link quality parameters may comprise at least one of:

1) Maximum and representative values of an acceptable delay. These parameters thus specify how fast the wireless link must be capable of conveying information between the network node and the wireless device. The maximum delay value is the highest delay that can be tolerated whatsoever, while the representative delay value is a delay that can be tolerated even though higher delay values are allowed to occur occasionally as long as they do not exceed the maximum delay value.
2) A sampling frequency needed for sampling of the control signals and feedback signals. The sampling frequency may also be denoted sampling rate or sampling period. Throughout his description "a sampling frequency" does not exclude that more than one sampling frequency is used, e.g. if multi-rate sampling is employed.
3) Maximum and representative values of an acceptable block error rate or bit error rate. These parameters thus specify how much error can be tolerated in the information communicated between the network node and the wireless device. The maximum error rate value is the highest error rate that can be tolerated whatsoever, while the representative error rate value is a block or bit error rate that can be tolerated even though higher error rate values are allowed to occur occasionally as long as they do not exceed the maximum error rate value.
4) Maximum and representative values of an acceptable bandwidth or data rate. The maximum bandwidth or data rate value is the highest bandwidth or data rate that will be needed, while the representative bandwidth or data rate value is a bandwidth or data rate that should be provided most of the time.

It should be noted that the term "representative value" may also be denoted typical value, and that it could be an average or mean value determined from several values. In another possible embodiment, the above link quality parameters in the request message may have been defined for different types of feedback signals and control signals in said process. In other words, one set of link quality parameters may have been defined for a certain type of feedback signals and control signals while a different set of link quality parameters may have been defined for another type of feedback signals and control signals, and so forth.

In other possible embodiments, the request message may further comprise a request for process characteristics parameters defining the process. It was thus mentioned above that the process may have been defined in terms of various process characteristics parameters. The process characteristics parameters may comprise at least one of:

1) A crossover frequency representative of the process.
2) A dominating time constant representative of the process.
3) a signal delay representative of the process.
4) a nonlinearity representative of the process.
5) a variation range of the feedback signals and the control signals.
6) parameters of a transfer function representative of the process.
7) parameters of one or more differential equations representative of the process.

At least some of the above-mentioned terms and parameters will be explained later below when examples of a process are described.

In other possible embodiments, the request message may further comprise a request for controller requirement parameters defining a required performance of a controller function for the process. It was thus mentioned above that the required performance of a controller function for the process may have been defined in terms of various controller requirement parameters. The controller requirement parameters may comprise at least one of:

1) A closed loop bandwidth needed for the process.
2) An acceptable closed loop static error.
3) A required static disturbance suppression.
4) Parameters of a required sensitivity transfer function.
5) Parameters of a required complementary sensitivity transfer function.

At least some of the above-mentioned terms and parameters will be explained later below when examples of a process are described.

Figure 4:
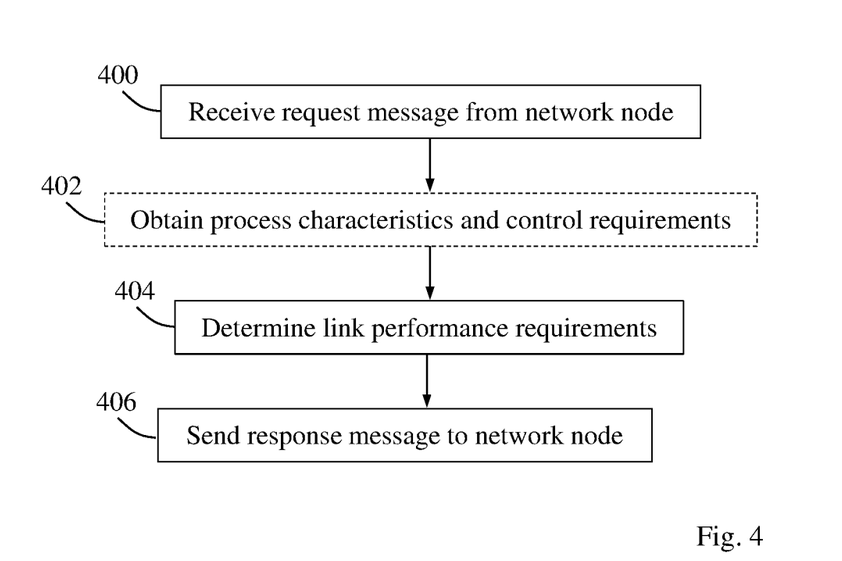
FIG. 4 is a flow chart illustrating a procedure in a wireless device, according to further possible embodiments.

An example of how the solution may be employed in terms of actions in a procedure performed by a wireless device for assisting configuration of a wireless link to be used for controlling a process at the wireless device, will now be described with reference to the flow chart in FIG. 4. Again it is assumed that the process involves communication of control signals and feedback signals between a network node of a radio network and the wireless device over the wireless link. This procedure can thus be used to accomplish the functionality and advantages described above, and some further possible but non-limiting embodiments will also be described below. The procedure of FIG. 4 may thus be performed by the wireless device 202 when being served by the network node 200 as illustrated in FIG. 2. The procedure shown in FIG. 3 may be performed by the wireless device after the network node has transmitted the request message as of action 302 in FIG. 3.

A first action 400 illustrates that the wireless device receives a request message from the network node, the request message comprising a request for performance requirements of the wireless link needed for the communication of control signals and feedback signals. Another action 402 illustrates that the wireless device may obtain 1) characteristics of the process, and/or 2) requirements for how the process is controlled, to be used in the next action. These process characteristics and/or controller requirements may be obtained from a database or memory holding such information about the process in question, or as manual input made by a human.

In a next action 404, the wireless device determines the performance requirements of the wireless link based on at least one of: 1) characteristics of the process, and 2) requirements for how the process is controlled, e.g. in the manner outlined above. A further action 406 illustrates that the wireless device sends a response message to the network node, the response message comprising the determined performance requirements of the wireless link, which corresponds to action 304 in FIG. 3. Thereby, the network node is enabled to configure the wireless link so that the performance requirements of the wireless link are fulfilled, as of action 306 in FIG. 3.

Various further possible but non-limiting embodiments will now be mentioned, which basically correspond to several of the above-described embodiments of the procedure in FIG. 3. In some possible embodiments, the response message may further comprise requested link quality parameters defining the performance requirements, as requested by the network node. The link quality parameters may comprise at least one of:
1) Maximum and representative values of an acceptable delay.
2) A sampling frequency needed for sampling of the control signals and feedback signals. As mentioned above, one or more sampling frequencies may be used as link quality parameter(s) if applicable.
3) Maximum and representative values of an acceptable block error rate or bit error rate.
4) Maximum and representative values of an acceptable bandwidth or data rate.

In another possible embodiment, the above link quality parameters in the response message may have been defined for different types of feedback signals and control signals in said process.

In other possible embodiments, the response message may further comprise requested process characteristics parameters defining the process, as requested by the network node. The process characteristics parameters may comprise at least one of:
1) A crossover frequency representative of the process.
2) A dominating time constant representative of the process.
3) a signal delay representative of the process.
4) a nonlinearity representative of the process.
5) a variation range of the feedback signals and the control signals.
6) parameters of a transfer function representative of the process.
7) parameters of one or more differential equations representative of the process.

In other possible embodiments, the response message may further comprise requested controller requirement parameters defining a required performance of a controller function for the process, as requested by the network node. The controller requirement parameters may comprise at least one of:
1) A closed loop bandwidth needed for the process.
2) An acceptable closed loop static error.
3) A required static disturbance suppression.
4) Parameters of a required sensitivity transfer function.
5) Parameters of a required complementary sensitivity transfer function.

An example of how the wireless device may determine the performance requirements in action 404, will now be described. Thus in one possible embodiment, determining the performance requirements of the wireless link may comprise computing an allowed round trip time T of the wireless link so that the phase loss $\varphi$ over the wireless link is below a predefined value $-\varphi_{max}$ at a required bandwidth $\omega$. In this case, another possible embodiment is that the computing of the allowed round trip time T may for example be performed as:

$$\text{Arg}(e^{-j\omega T}) < -\varphi_{max}, \text{ which gives } T < \tan^{-1}(\varphi_{max})/\omega,$$

where j is the imaginary number component or unit comprised in a complex number.

Figure 5:
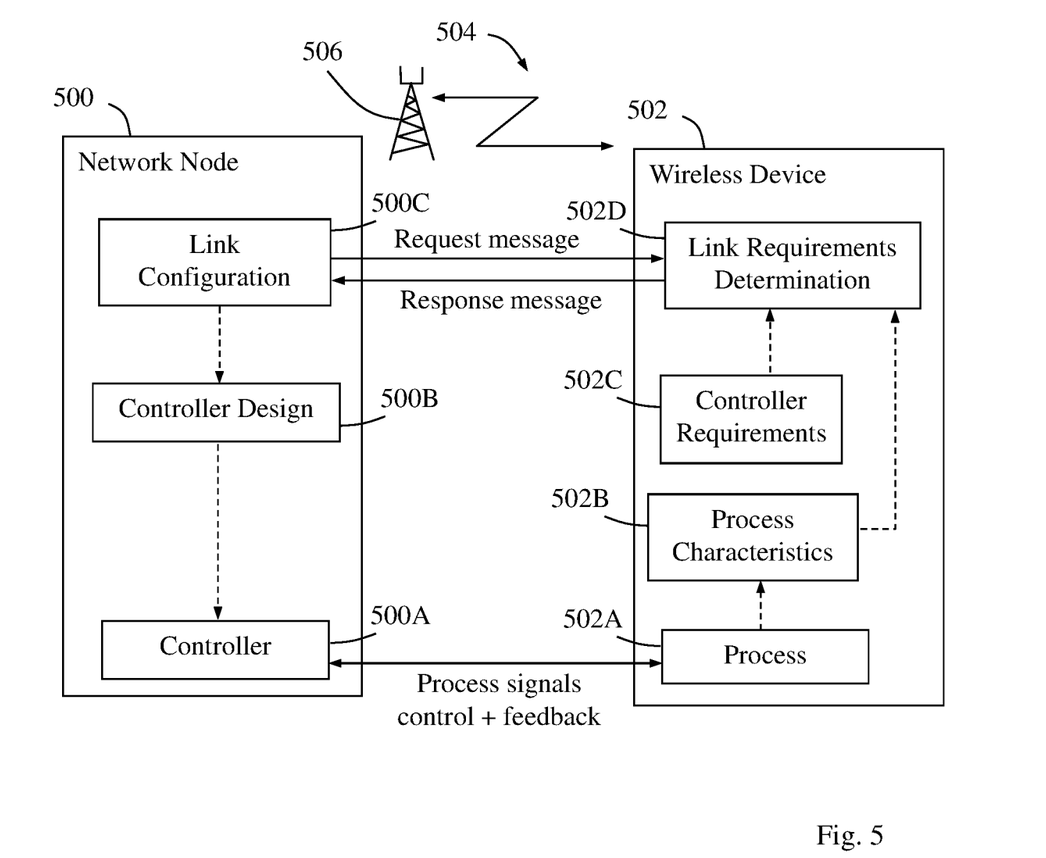
FIG. 5 is a block diagram illustrating an example of how functions may be implemented in a network node and in a wireless device, according to further possible embodiments.

An example of how functions may be implemented in a network node and in a wireless device will now be described with reference to the block diagram in FIG. 5 illustrating a network node 500, a wireless device 502, a wireless link 504 and a base station 506 serving the wireless device 502. It was mentioned above that the network node of this solution may be a serving base station used for wireless communication with the wireless device, or a node that controls the serving base station. Thus in this figure the network node 500 may coincide with the base station 506, or it may be a separate node connected to and communicating via the base station 506.

The network node 500 comprises a controller 500A arranged to perform control of a process 502A arranged at the wireless device 502. The network node 500 also comprises a function for controller design 500B which is arranged to design the controller 500A. The network node 500 further comprises a function for link configuration 500C which is arranged to configure the wireless link 504 by sending a request message to the wireless device 502 and receiving a response message from the wireless device 502, basically in a manner that has been described above.

The wireless device 502 comprises a function for executing the process 502A and a function for obtaining the above-described process characteristics parameters 502B. The wireless device 502 also comprises a function for obtaining the above-described controller requirements 502C. The wireless device 502 further comprises a function for determination of link requirements 502D which receives input from the functions for obtaining process characteristics parameters 502B and controller requirements 502C, as indicated by dashed arrows. The functions for link requirements determination 502D and link configuration 500C in the wireless device 502 and the network node 500, respectively, are shown to communicate the above-described request and response messages. Further, the process function 502A and the controller 500A in the wireless device 502 and the network node 500, respectively, are shown to communicate process signals including the above-described control and feedback messages over the configured wireless link.

Figure 6:
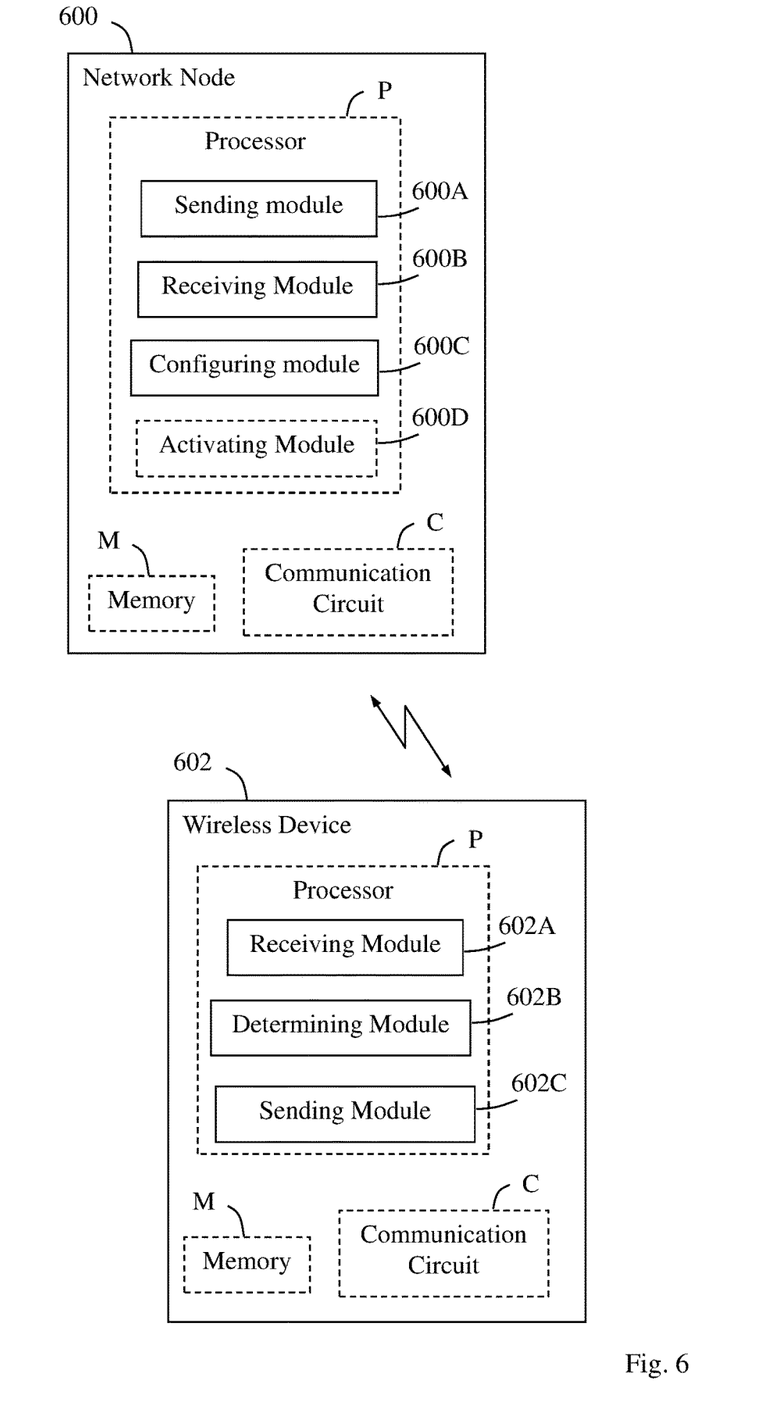
FIG. 6 is a block diagram illustrating a network node and a wireless device in more detail, according to further possible embodiments.

The block diagram in FIG. 6 illustrates a detailed but non-limiting example of how a network node 600 and a wireless device 602, respectively, may be structured to bring about the above-described solution and embodiments thereof. In this figure, the network node 600 and the wireless device 602 may be configured to operate according to any of the examples and embodiments of employing the solution as described above, where appropriate, and as follows. Each of the network node 600 and the wireless device 602 is shown to comprise a processor "P", a memory "M" and a communication circuit "C" with suitable equipment for transmitting and receiving messages in the manner described herein.

The communication circuit C in each of the network node 600 and the wireless device 602 thus comprises equipment configured for communication with each other using a suitable protocol for the communication depending on the implementation. The solution is however not limited to any specific types of data or protocols.

The network node 600 comprises means, e.g. in the form of modules or the like, configured or arranged to perform at least some of the actions of the flow chart in FIG. 3 in the manner described herein. Further, the wireless device 602 comprises means, e.g. in the form of modules or the like, configured or arranged to perform at least some of the actions of the flow chart in FIG. 4 in the manner described above. These actions and procedures may be performed by means of functional modules in the respective processor P in the network node 600 and the wireless device 602 as follows.

The network node 600 is arranged to configure a wireless link to be used for controlling a process at a wireless device 602. The process, not shown, involves communication of control signals and feedback signals over the wireless link. The network node 600 is operative to send a request message to the wireless device, the request message comprising a request for performance requirements of the wireless link needed for the communication of control signals and feedback signals. This operation may be performed by a sending module 600A in the network node 600, e.g. as described for action 302.

The network node 600 is further operative to receive a response message from the wireless device 602. The response message comprises the performance requirements of the wireless link, wherein the performance requirements of the wireless link are dependent on at least one of: 1) characteristics of the process, and 2) requirements for how the process is controlled. This operation may be performed by a receiving module 600B in the network node 600, e.g. as described for action 304.

The network node 600 is also operative to configure the wireless link so that the performance requirements of the wireless link are fulfilled. This operation may be performed by a configuring module 600C in the network node 600, e.g. as described for action 306. For example, the network node 600 may also be operative to. This activating operation may be performed by an activating module 600D in the network node 600, e.g. as described for action 308.

The wireless device 602 is arranged to assist configuration of a wireless link to be used for controlling a process at the wireless device 602, said process involving communication of control signals and feedback signals over the wireless link. The wireless device 602 is configured to receive a request message from a network node 600 of a radio network, the request message comprising a request for performance requirements of the wireless link needed for the communication of control signals and feedback signals. This receiving operation may be performed by a receiving module 602A in the wireless device 602, e.g. in the manner described for action 400.

The wireless device 602 is further configured to determine the performance requirements of the wireless link based on at least one of: 1) characteristics of the process, and 2) requirements for how the process is controlled. This determining operation may be performed by a determining module 602B, e.g. in the manner described for action 404.

The wireless device 602 is also configured to send a response message to the network node 600, the response message comprising the determined performance requirements of the wireless link. This operation may be performed by a sending module 602C in the wireless device 602, e.g. in the manner described for action 406. Thereby, the network node 600 is enabled to configure the wireless link so that the performance requirements of the wireless link are fulfilled.

It should be noted that FIG. 6 illustrates various functional modules in the network node 600 and the wireless device 602, respectively, and the skilled person is able to implement these functional modules in practice using suitable software and hardware. Thus, the solution is generally not limited to the shown structures of the network node 600 and the wireless device 602, and the functional modules therein may be configured to operate according to any of the features and embodiments described in this disclosure, where appropriate.

The functional modules 600A-D and 602A-C described above can be implemented in the network node 600 and the wireless device 602, respectively, by means of program modules of a respective computer program comprising code means which, when run by the processor P causes the network node 600 and the wireless device 602 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the network node 600 and the wireless device 602 in the form of a memory having a computer readable medium and being connected to the processor P. The computer program product or memory M in each of the network node 600 and the wireless device 602 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective network node 600 and wireless device 602.

The solution described herein may be implemented in each of the network node 600 and the wireless device 602 by a computer program comprising instructions which, when executed on at least one processor, cause the at least one processor to carry out the actions according to any of the above embodiments, where appropriate. The solution may also be implemented at each of the network node 600 and the wireless device 602 in a carrier containing the above computer program, wherein the carrier is one of an electronic signal, optical signal, radio signal, or computer readable storage medium.

Some of the above-mentioned parameters and terminology are commonly used in the field of automatic control, and will now be explained in more detail.

First, a number of representations of a dynamic process will be outlined. A dynamic process is a process where the output depends not only on the present input signal but also of previous inputs and outputs. This means that the dynamic process has "memory". The most basic dynamic process is a linear process that can be described by a differential equation as:

$$y^{(n)}(t)+a_1 y^{(n-1)}+\ldots+a_n y(t)=b_0 u^{(n)}(t)+\ldots b_n u(t).$$

Here y(t) is the output signal of the process, u(t) is the input signal of the process, t is the time, while $a_i$, i=1 . . . n and $b_j$, j=0, . . . , m are constant parameters. $^{(i)}$ denotes differentiation with respect to time, i times. The above differential equation has an order equal to n. The equation has one input signal and one output signal. For simplicity, all concepts are explained in this context, but the generalization to more than one input signal and more than one input signal can be found in conventional textbooks related to automatic control.

By taking Laplace transforms and setting initial values to zero, the differential equation is transformed to be represented by a transfer function H(s), where s denotes the Laplace transform variable which is closely related to the angular frequency used in Fourier transforms. The result is:

$$H(s) = \frac{B(s)}{A(s)} = \frac{b_0 s^m + b_1 s^{m-1} + b_m}{s^n + a_1 s^{n-1} + \ldots + a_n}$$

The relation between the output signal and input signal Laplace transforms Y(s) and U(s) are:

$$Y(s) = H(s)U(s)$$

The poles $p_i$, i=1, ..., n of the process are given by the equation A(s)=0. For simplicity only strictly stable (open loop) processes with all poles in the left complex half plane are considered here. In general, poles are real or complex conjugate pairs.

The properties of the dynamic process can also be studied in the frequency domain in terms of complex valued frequency functions Y(jω), H(jω) and U(jω). ω denotes the angular frequency that fulfils $$\omega = 2\pi f,$$

where $f$ is the frequency in Herz, Hz. Below, the term frequency is used for angular frequency. Some basic quantities used in this description can now be defined as follows.

The crossover frequency is the frequency $\omega_c$ where $|H(j\omega_c)|=1$. It should be noted that the equation defining crossover frequency can contain the controller gain. The crossover frequency is seldom considered for closed loop cases.

The dominating pole(s) of the process is the pole(s) being closest to s=0, i.e. the pole(s) that represent the slowest decay. Mathematically the dominating pole(s) is given by: $i_{dominating} = \arg_i \min |p_i|$ The dominating time constant is the time constant of the dominating pole, i.e. the quantity $T_{dominating} = 1/p_{dominating}$ The bandwidth of the process is defined as the frequency where the gain has fallen to $1/\sqrt{2}$ times the static gain, i.e. by 3 dB. The bandwidth is most often used for closed loop systems. Mathematically the bandwidth is the frequency $\omega_{BW}$, such that: $|H(j\omega_{BW})|^2 = (1/2)|H(0)|^2$ The delay of the process is the time T such that the output of the process at time t is only a function of times τ≤t−T.

The nonlinearity Φ of the process can e.g. be expressed relative to linearity as $k_1 u \leq \Phi(u) \leq k_2 u$. This is denoted a sector condition. Other definitions are also possible.

The range of a signal r(t) of the process is the interval of variation of the signal, i.e. a measure of how much the signal can be varied, expressed as:

$$r(t) \in [r_{min}, r_{max}].$$

Figure 7:
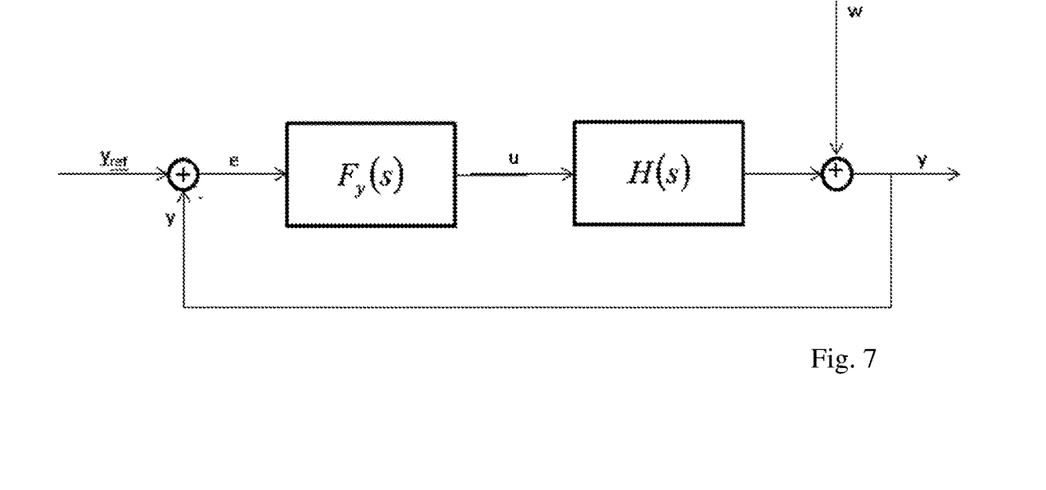
FIG. 7 is a block diagram illustrating some terms and parameters commonly used in the field of automatic control.

The following definitions are illustrated in FIG. 7, where $F_y$(s) is the feedback gain. The closed loop system is then computed as follows:

$$Y(s) = W(s) + H(s)F_y(s)(Y_{ref}(s) - Y(s)),$$

which gives $$Y(s) = \frac{F_y(s)H(s)}{1 + F_y(s)H(s)} Y_{ref}(s) + \frac{1}{1 + F_y(s)H(s)} W(s)$$

This provides the effect of the reference signal and the disturbance on the output. Here Y(s) is the Laplace transform of the output signal, i.e. the quantity to be controlled, W(s) is the Laplace transform of the disturbance, H(s) is the transfer function of the process, $Y_{ref}$(s) is the Laplace transform of the reference signal that is to be tracked by Y(s). The remaining definitions now follow.

The closed loop bandwidth $\omega_{CL}$ of the control system is given by the equation $$\left| \frac{F_y(j\omega_{CL})H(j\omega_{CL})}{1 + F_y(j\omega_{CL})H(j\omega_{CL})} \right|^2 = \frac{1}{2} \left| \frac{F_y(0)H(0)}{1 + F_y(0)H(0)} \right|^2$$

The closed loop static error of the control system is given by the equation $$y_{ref} - y = \frac{1}{1 + F_y(0)H(0)}(y_{ref} - w)$$

The static disturbance rejection of the control system is given by the static sensitivity function $$S(0) = \frac{1}{1 + F_y(0)H(0)}$$

The dynamic disturbance rejection of the control system is determined by the sensitivity function $$S(j\omega) = \frac{1}{1 + F_y(j\omega)H(j\omega)}$$

The complimentary sensitivity function of the control system, T(jω)=1−S(jω) determines the robustness of the control system with respect to non-modelled dynamics.

Automatic control is a field where systems and processes are controlled to operate as intended and specified, regardless of any shortcomings e.g. in mechanical design such as motor performance and sensor accuracy. In general, automatic control design problems are commonly addressed in different stages including:

Defining a specification where requirements on the controlled system are identified and quantified. Examples include bandwidth, steady state accuracy, and stability regions. Specifications are commonly expressed over the whole (frequency) operating range in terms of different performance variables, for example sensitivity functions.

Modeling, where a model suitable for selection of a controller algorithm is developed. This model is often in mathematical form, expressed in terms of differential equations, difference equations or block diagrams.

Design, where the model and specifications are combined to produce a controller. This design may take several different forms, but it is typically based on systematic mathematical calculations that often solve an optimization problem or the like.

Implementation, where the controller is realized and connected to the available hardware, to produce the controlled system or process.

Test and verification, where it is checked that the specifications are met.

Automatic control algorithms can be based on feedback or feedforward. There is for example a technology denoted networked control systems (NCS), where the controller and the controlled process are located at different sides of an interface, typically a wireless interface connecting a controller node and a controlled process node. Some examples of how a process may be controlled where the solution and embodiments herein may be employed, will now be described.

Feedback

Figures 8, 9:
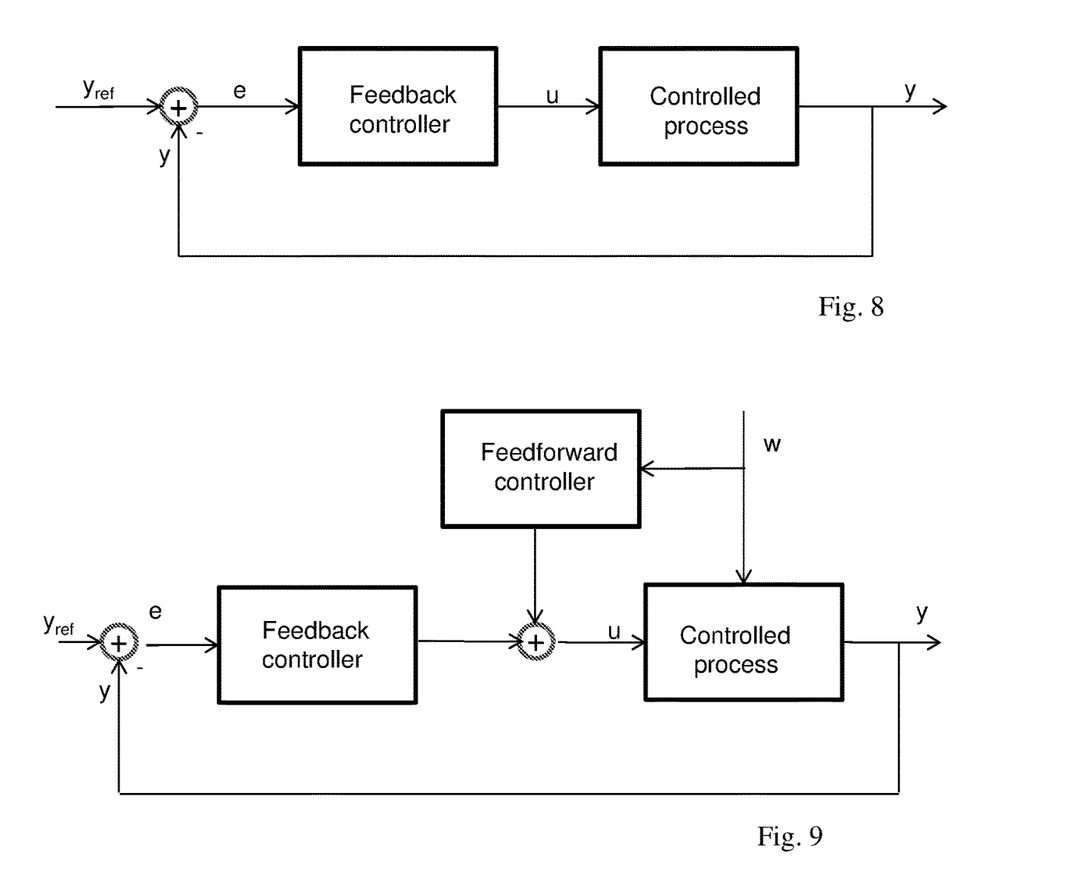
FIGS. 8-10 are block diagrams illustrating different examples of how a process may be controlled.

An elementary feedback loop is schematically illustrated in FIG. 8. The symbols shown in this figure and forthcoming figures are basically functions of time, although this is not explicitly indicated. In FIG. 8, the control objective is to achieve a situation where the output y is tracking a reference signal $y_{ref}$ as closely as the specification requires, possibly subject to assumptions on variations of the reference signal. The output y is therefore measured and fed back to the controller input where it is compared to the reference signal by forming the control error e as:

$$e = y_{ref} - y.$$

The controller then uses the present and previous control errors together with previous control signals to produce the present control signal u. The fact that the previous control errors and control signals are used to generate the present control signal makes the controller dynamic. This is needed since in general the controlled process is also dynamic. The dynamics is usually modeled by differential equations or difference equations. For linear systems, dynamics can also be handled in the frequency domain. Laplace or Fourier transformation is used to obtain the frequency domain description. The control signal u then affects the controlled process, which produces the output signal y, based on previous outputs and the present and previous control signals.

Feedforward

An elementary feedforward controller is schematically illustrated in FIG. 9, where a feedforward component is added to the feedback components shown in FIG. 8. Feedforward becomes possible when a disturbance w that affects the system can be measured. Then the measurement can be fed to a feedforward controller that operates to compensate for its effect on the output signal before a feedback error has increased significantly. This way, the feedback part of the controller does not need to regulate as large and fast errors as in the case where feedforward is not used. Technically this means that the feedback controller gain can be reduced which is beneficial for stability. A successful application of feedforward hinges on an accurate model of how the output is affected by the disturbance through the controlled process. This model is built into the feedforward controller that predicts the effect of itself on the output signal. The consequence is that the feedforward controller can (sometimes) be designed to produce the negative of the effect of the disturbance on the output via the system, thereby effectively cancelling the disturbance.

Networked Control Systems

Figure 10:
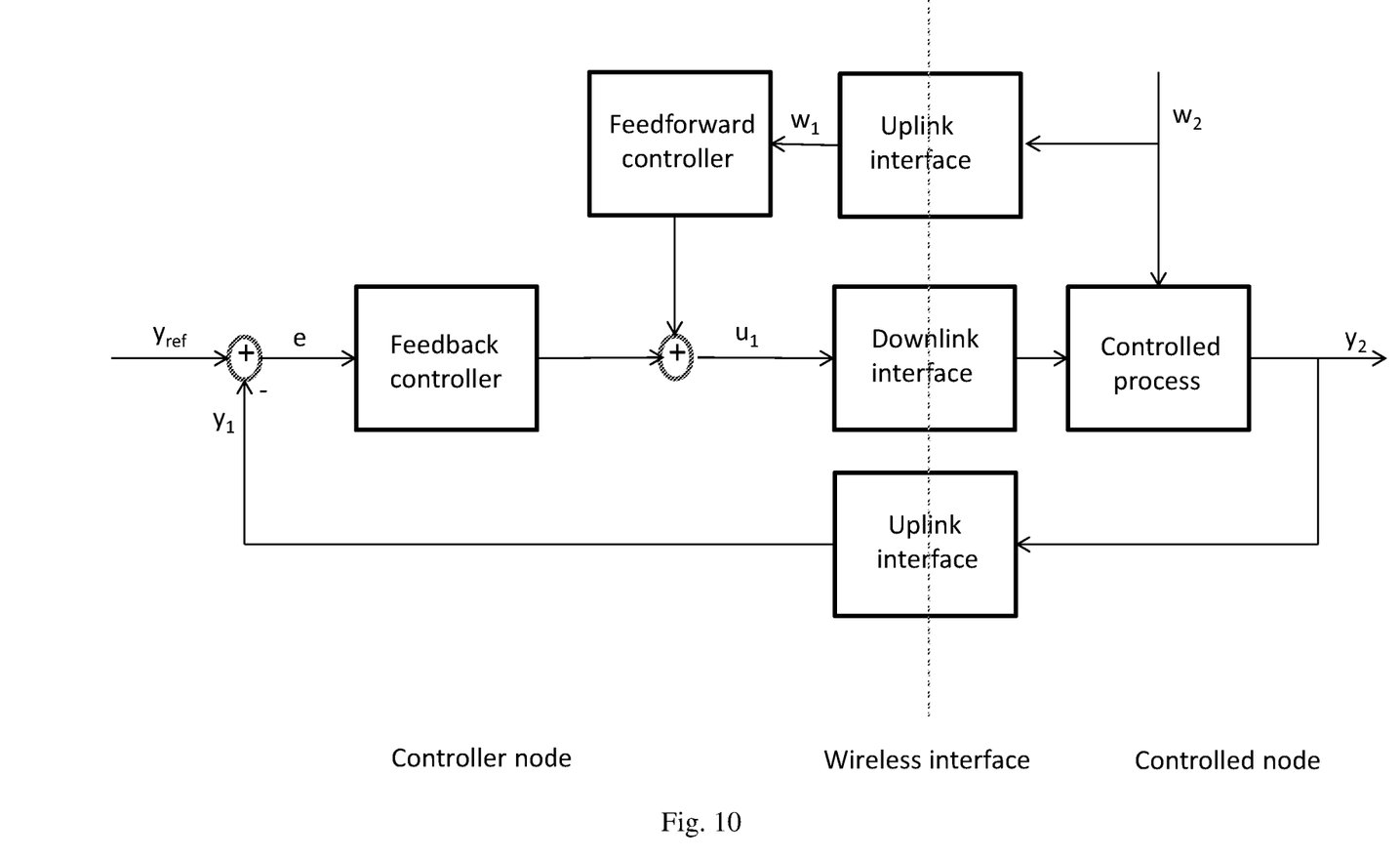

An NCS over a wireless interface is depicted in FIG. 10. In this example there is a wireless interface between the controller and the controlled process. It can be assumed that the wireless interface is not perfect, therefore it affects the control signal in the downlink, while it also affects the measured output and the measured disturbance in the uplink. The impact on signals communicated over a wireless interface is typically in the form of a delay and/or in the form of bit errors or block errors. More significant delays can further occur in communications over Internet connections comprising several links other than wireless interfaces.

It can be concluded that the characteristics of the wireless link affect the overall controlled process and the wireless link needs to be adapted accordingly, in order not to change the controlled process dynamics so much that the specified performance is compromised. This can thus be achieved by employing one or more of the embodiments described herein.

Process Characteristics

As stated above, an accurate model may be needed to achieve a good controller design, be it with feedback or feedforward. For the NCS case, the model needs to be made available for controller design somewhere and configured in the controlling entity such as the process controller 200A shown in FIG. 2 or the controller 500A shown in FIG. 5. A list with examples of process characteristics parameters that can be used for design, is provided below.

- The cross over frequency of the process. The crossover frequency is defined as the frequency where the open loop gain is 1. This parameter is closely related to the bandwidth, or dominating time constant of the open loop system, which may also be used. The cross over frequency is defined only with respect to the input signal.
- The delay of the process, both with respect to the input and any measureable disturbance.
- The nonlinearity of the process, both with respect to the input and any measureable disturbance. This can be expressed as a percentage.
- The ranges of the inputs and outputs of the process including the measureable disturbance.
- The bandwidth of the measureable disturbance.

In summary, there are a large number of possibilities to characterize a process for controller design, and the above list contain some illustrative but non-limiting examples.

Controller Requirements

In order to design a controller, the process characteristics parameters may not be sufficient and the controller design may also need to account for the specifications. Therefore, it may be helpful to consider the above-described controller requirement parameters when determining the above performance requirements. Some common controller requirement parameters include:

- The closed loop bandwidth. This determines how fast the response is with respect to changes in the reference signal.
- The closed loop static error. This determines how accurate the regulation is, for a constant reference signal.
- The static closed loop disturbance suppression. Sometimes the static case is considered, i.e. the case where a static disturbance and a static reference is applied to the system. In this case the disturbance suppression is characterized by the difference $y_{ref}-y$ after the transients have faded out. The disturbance may be measurable or unmeasurable.
- The dynamic closed loop disturbance suppression. Classical control theory proves that the dynamic, or frequency dependent, disturbance suppression is coupled to the sensitivity function. This function depends on the feedback controller and the process dynamics. The sensitivity function is therefore characterized by the parameters of its transfer function.

The robustness with respect to modeling errors. Classical control theory proves that the robustness with respect to modeling errors is coupled to the complementary sensitivity function. This function depends on the feedback controller and the process dynamics. The complementary sensitivity function is therefore characterized by the parameters of its transfer function.

In summary, there are a large number of possibilities to characterize a process for controller design, the above list contain some common ones.

While the solution has been described with reference to specific exemplifying embodiments, the description is generally only intended to illustrate the inventive concept and should not be taken as limiting the scope of the solution. For example, the terms "network node", "wireless device", "process", "control signals", "feedback signals", "process characteristics" and "performance requirements" have been used throughout this disclosure, although any other corresponding entities, functions, and/or parameters could also be used having the features and characteristics described here. The solution is defined by the appended claims.

The invention claimed is:

1. A network node arranged to configure a wireless link to be used for controlling a process at a wireless device, wherein the network node comprises:
   a communication circuit;
   at least one processor operatively coupled to the communication circuit; and
   at least one memory storing computer-executable instructions that, when executed by the at least one processor, configure the network node to:
      send, to the wireless device, a request message comprising a request for performance requirements, of the wireless link, needed for controlling the process at the wireless device via communication of control signals and feedback signals over the wireless link,
         wherein the request message further comprises a request for link quality parameters defining the performance requirements, the link quality parameters comprising maximum and representative values of an acceptable delay and a sampling frequency needed for sampling of the control signals and feedback signals,
         wherein the request message further comprises a request for process characteristics parameter defining the process, the process characteristics parameter comprises a cross over frequency representative of the process and/or a request for controller requirement parameter defining a required performance of a controller function in the process, the controller requirement parameters comprises an acceptable closed loop static error;
      receive, from the wireless device, a response message comprising the performance requirements of the wireless link, the performance requirements being dependent on at least one of the following:
         characteristics of the process which reflect the properties of the process itself, and requirement for how the process is controlled which reflect what is needed to achieve satisfactory control of the process, wherein the response message further comprises the requested process characteristics parameter and/or the requested controller requirement parameters; and
      configure the wireless link so that the performance requirements of the wireless link can be fulfilled.

2. A network node according to claim 1, wherein the link quality parameters further comprises:
   maximum and representative values of an acceptable block error rate or bit error rate; and
   maximum and representative values of an acceptable bandwidth or data rate.

3. A network node according to claim 2, wherein the link quality parameters are defined for different types of feedback signals and control signals in said process.

4. A network node according to claim 1, wherein execution of the instructions further configures the network node to activate the configured wireless link for the communication of feedback signals and control signals with the wireless device for controlling the process at the wireless device.

5. A network node according to claim 1, wherein the process characteristics parameters comprising at least one of:
   a dominating time constant representative of the process;
   a signal delay representative of the process;
   a nonlinearity representative of the process;
   a variation range of the feedback signals and the control signals;
   parameters of a transfer function representative of the process; and
   parameters of one or more differential equations representative of the process.

6. A wireless device arranged to assist configuration of a wireless link to be used for controlling a process at the wireless device, wherein the wireless device comprises:
   a communication circuit;
   at least one processor operatively coupled to the communication circuit; and
   at least one memory storing computer-executable instructions that, when executed by the at least one processor, configure the wireless device to:
      receive, from a network node of a radio network, a request message comprising a request for performance requirements of the wireless link needed for controlling the process at the wireless device via communication of control signals and feedback signals over the wireless link
         wherein the response message further comprises requested link quality parameters defining the performance requirements, the link quality parameters comprising maximum and representative values of an acceptable delay and a sampling frequency needed for sampling of the control signals and feedback signals,
         wherein the request message further comprises a request for process characteristics parameter defining the process, the process characteristics parameter comprises a cross over frequency representative of the process and/or a request for controller requirement parameter defining a required performance of a controller function in the process, the controller requirement parameters comprises an acceptable closed loop static error;
      determine the performance requirements of the wireless link based on at least one of the following:
         characteristics of the process which reflect the properties of the process itself, and requirement for how the process is controlled which reflect what is needed to achieve satisfactory control of the process, wherein the response message further comprises the requested process characteristics parameter and/or the requested controller requirement parameters; and send, to the network node, a response message comprising the determined performance requirements of the wireless link, thereby enabling the network node to configure the wireless link so that the performance requirements of the wireless link can be fulfilled.

7. A wireless device according to claim 6, wherein further comprises:
maximum and representative values of an acceptable block error rate or bit error rate; and
maximum and representative values of an acceptable bandwidth or data rate.

8. A wireless device according to claim 7, wherein the link quality parameters are defined for different types of feedback signals and control signals in said process.

9. A wireless device according to claim 6, wherein the process characteristics parameters comprising at least one of:
a dominating time constant representative of the process;
a signal delay representative of the process;
a nonlinearity representative of the process;
a variation range of the feedback signals and the control signals;
parameters of a transfer function representative of the process; and
parameters of one or more differential equations representative of the process.

10. A wireless device according to claim 6, wherein the controller requirement parameters comprising at least one of:
a closed loop bandwidth needed for the process;
a required static disturbance suppression;
parameters of a required sensitivity transfer function; and
parameters of a required complementary sensitivity transfer function.

11. A method performed by a network node of a radio network, for configuring a wireless link to be used for controlling a process at a wireless device, the method comprising:
sending, to the wireless device, a request message comprising a request for performance requirements, of the wireless link, needed for controlling the process at the wireless device via communication of control signals and feedback signals over the wireless link,
wherein the request message further comprises a request for link quality parameters defining the performance requirements, the link quality parameters comprising maximum and representative values of an acceptable delay and a sampling frequency needed for sampling of the control signals and feedback signals,
wherein the request message further comprises a request for process characteristics parameter defining the process, the process characteristics parameter comprises a cross over frequency representative of the process and/or a request for controller requirement parameter defining a required performance of a controller function in the process, the controller requirement parameters comprises an acceptable closed loop static error;
receiving, from the wireless device, a response message comprising the performance requirements of the wireless link, the performance requirements being dependent on at least one of the following: characteristics of the process which reflect the properties of the process itself, and requirement for how the process is controlled which reflect what is needed to achieve satisfactory control of the process, wherein the response message further comprises the requested process characteristics parameter and/or the requested controller requirement parameters; and configuring the wireless link so that the performance requirements of the wireless link can be fulfilled.

12. A method according to claim 11, further comprising activating the configured wireless link for the communication of feedback signals and control signals with the wireless device for controlling the process at the wireless device.

13. A method according to claim 11, wherein the link quality parameters further comprises
maximum and representative values of an acceptable block error rate or bit error rate; and
maximum and representative values of an acceptable bandwidth or data rate.

14. A method performed by a wireless device for assisting configuration of a wireless link to be used for controlling a process at the wireless device, the method comprising:
receiving, from a network node of a radio network, a request message comprising a request for performance requirements of the wireless link needed for controlling the process at the wireless device via communication of control signals and feedback signals over the wireless link,
wherein the response message further comprises requested link quality parameters defining the performance requirements, the link quality parameters comprising maximum and representative values of an acceptable delay,
wherein the request message further comprises a request for process characteristics parameter defining the process, the process characteristics parameter comprises a cross over frequency representative of the process and/or a request for controller requirement parameter defining a required performance of a controller function in the process, the controller requirement parameters comprises an acceptable closed loop static error; and
a sampling frequency needed for sampling of the control signals and feedback signals;
determining the performance requirements of the wireless link based on at least one of the following: characteristics of the process which reflect the properties of the process itself, and requirement for how the process is controlled which reflect what is needed to achieve satisfactory control of the process, wherein the response message further comprises the requested process characteristics parameter and/or the requested controller requirement parameters; and
sending, to the network node, a response message comprising the determined performance requirements of the wireless link, thereby enabling the network node to configure the wireless link so that the performance requirements of the wireless link can be fulfilled.

15. A method according to claim 14, wherein the link quality parameters further comprises
maximum and representative values of an acceptable block error rate or bit error rate; and
maximum and representative values of an acceptable bandwidth or data rate.

16. A method according to claim 15, wherein the link quality parameters are defined for different types of feedback signals and control signals in said process.

* * * * *